Aug. 10, 1965 W. OLSEN 3,199,853
BELL-TYPE ANNEALING FURNACE AND METHOD OF SEALING SAME
Filed April 25, 1962
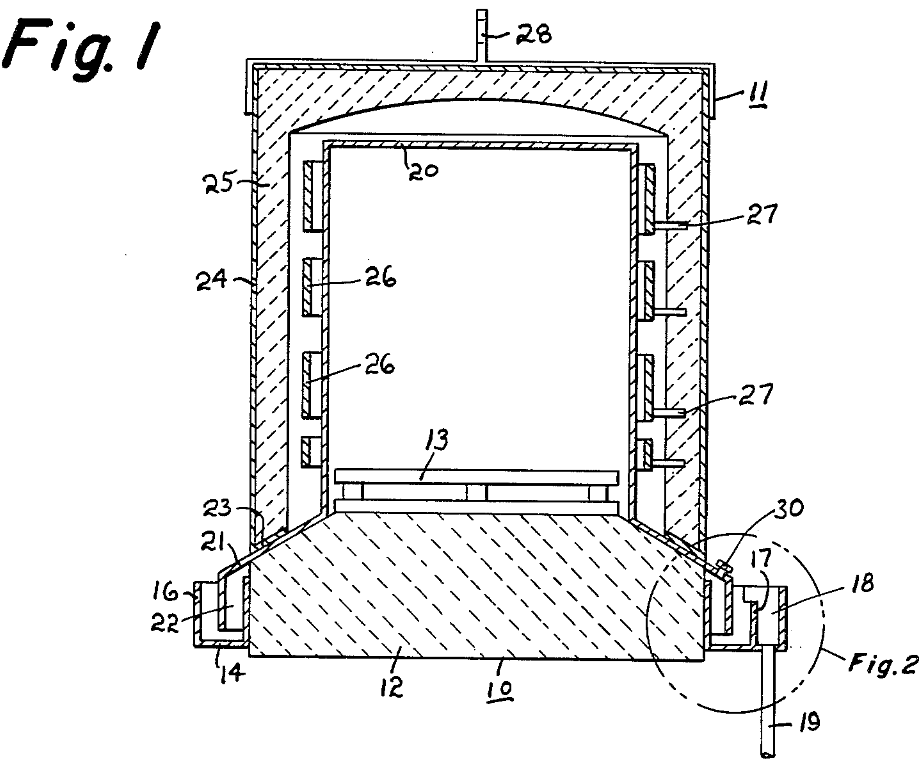
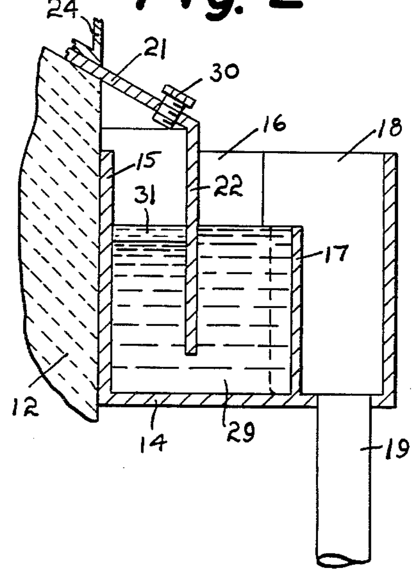
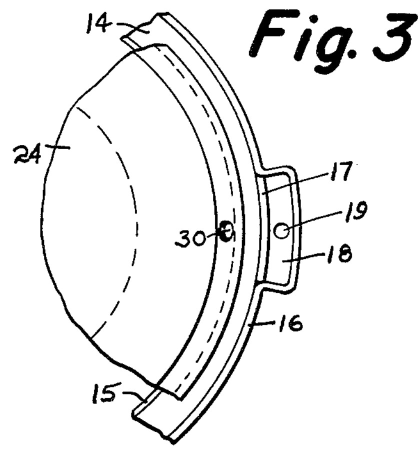
INVENTOR.
WILLY OLSEN
BY
Leon Edelson United States Patent Office 3,199,853
Patented Aug. 10, 1965

1

3,199,853

BELL-TYPE ANNEALING FURNACE AND METHOD OF SEALING SAME

Willy Olsen, Lynchburg, Va., assignor to H. K. Porter Company, Inc., Lynchburg, Va., a corporation of Delaware Filed Apr. 25, 1962, Ser. No. 190,069
7 Claims. (Cl. 266—5)

This invention relates generally to annealing furnaces, and more particularly relates to annealing furnaces of the bell-type and the means for sealing the interior of the furnaces from the outside atmosphere.

Bell-type annealing furnaces in general include a base structure with an annular open-topped trough disposed peripherally, thereabout and within which a flange or skirt of the cover assembly is normally disposed. The trough is usually filled with water or with oil to provide a peripheral seal effective to isolate the interior of the furnace housing from the ambient atmosphere. When water is used as the liquid seal, a problem arises due to the great heat to which the water is subjected from direct contact with heated parts of the furnace and which tends to cause vaporization of the water with the attendant possibility of decarburization or oxidation of the charge within the furnace. In an attempt to avoid the water vaporization problem, systems have been devised which provide for the continuous change of water in the sealing trough by drawing off the heated water and replacing it with cool water. While such continuous water exchange systems effected an improvement, they did not solve the problem. Another approach to the problem involved the use of oil as a replacement for the water in the trough. The oil, being less volatile, effected an improvement in degree but did not in fact solve the problem.

A continuous flow oil seal system would probably effect a satisfactory solution to the vaporization problem if the cost of such a system were not a factor to be considered, but as a matter of practical economics such a system is not feasible for the following reasons. In order to avoid vaporization of the oil itself the oil temperature must be kept below certain ranges. Cooling of the oil should be carried out by continuously withdrawing the oil from the sealing trough, passing it through a refrigerating system to effect cooling thereof and then returning the cooled oil to the trough. This system of course requires oil cooling apparatus which materially adds both to the initial cost of the furnace and the cost of operation. As an alternative to the provision of oil cooling equipment, the heated oil withdrawn from the sealing trough could be discharged into a waste drain while fresh oil was constantly injected into the trough to replace that being withdrawn. While this system eliminates the cooling apparatus it adds a high operating cost to the furnace because of the large quantities of oil consumed in the process. As a consequence, the continuous flow type of oil seal system is not economically feasible. Accordingly, it is a primary object of this invention to provide a novel liquid seal for bell-type annealing furnaces which provides the advantages attainable with a continuous flow oil seal system while retaining the low operating cost of a water seal system.

Another object of the invention is to provide a novel liquid seal which utilizes a film of oil as a sealing medium and maintains the oil film below vaporizing temperature by means of a water cooling agent.

Still another object of this invention is to provide a novel liquid seal for annealing furnaces as aforesaid wherein the liquid seal is effected by a combination of liquids one of which is relatively non-volatile and which effects the actual seal while the other of the liquids functions as a cooling medium for the first liquid.

2

The foregoing and other objects of the invention will become clear from a reading of the following specification in conjunction with an examination of the appended drawings, wherein:

FIGURE 1 is a vertical cross-sectional view through a bell-type annealing furnace according to the invention;

FIGURE 2 is an enlarged fragmentary view of that portion of the annealing furnace of FIGURE 1 enclosed in the phantom circle shown thereon; and FIGURE 3 is a fragmentary plan view of that portion of the furnace shown in FIGURE 1 in the region of the phantom circle.

In the several views, like elements are denoted by like reference characters.

Referring now to the figures, it is observed that the furnace includes a base section generally designated as 10 and a bell section generally designated as 11. The base 10 is made of refractory or insulating material 12 in the shape of a truncated cylinder upon the top surface of which is secured a charge support 13, and to the cylindrical side walls of which is secured an annular trough 14 extending completely peripherally about the base. The trough 14 is generally of U-shaped cross-section having inner and outer walls 15 and 16 respectively. The trough outer wall 6 is recessed vertically downward to form an overflow weir 17 which is enclosed by an overflow catch basin 18. Extending downward from the bottom of the catch basin 18 is a drain pipe 19 which carries off the trough water which flows into the catch basin 18 over the weir 17, this overflow condition being produced by continuous water injection into the trough 14 at a point which would generally be located substantially halfway around the trough 14 from the catch basin 18.

The furnace bell 11 includes a metal inner hood 20 of generally cylindrical shape closed at the top and open at the bottom. From the bottom of the hood there extends in continuation thereof a radially outwardly and downwardly sloping annular wall section 21 which terminates at its outer periphery in a vertically downwardly extending cylindrical skirt 22. Surrounding the cylindrical hood 20 in spaced relation therefrom with the lower inturned edge 23 seated upon the annular wall 21 and secured thereto is a bell housing 24 lined with refractory or heat insulating material 25. Extending peripherally about the cylindrical hood 20 and secured thereto for good thermal transfer are a plurality of electrical heating coils 26 energizable from a source of electric power by means of the conductors 27. Secured to the top of the bell housing 24 is a lifting eye 28 by means of which the entire furnace bell structure 11 may be lifted from the base 10 for purposes of loading and unloading the furnace.

As is most clearly seen in FIGURE 1, the annular wall 21 of the bell 11 seats substantially flatwise upon the truncated surface of the refractory base cylinder 12, and when so disposed positions the cylindrical skirt 22 within the annular trough 14 approximately midway between the inner and outer walls 15 and 16. As best seen in FIGURE 2, the trough 14 is filled with water 29 which rises to the level of the top of the weir 17 to thereby seal the interior of the cylindrical hood 20 from the ambient atmosphere by closing off the space between the trough wall 15 and cylindrical skirt 22. The continuously incoming water to the trough 14 cannot of course overflow the trough outer wall 16 because the water level rise above the top of the weir 17 is limited by overflow into the catch basin 18 and removal through the drain pipe 19. Energization of the heating coils 26 to produce high tempeartures within the cylindrical hood 20 causes the cylindrical hood 20 and annular wall 21 and cylindrical skirt 22 to become very hot and therefor raise the temperature of the water 29 flowing in the trough 14. This in turn tends to cause vaporization of the water between the trough wall 15 and cylindrical skirt 22, the vaporized water molecules being then capable of penetrating under the annular wall 21 into the interior of the cylindrical hood 20 and causing oxidation or decarburization of the charge being treated within the hood.

In order to prevent this water vaporization condition from arising, the annular wall 21 of the furnace bell is drilled and tapped and fitted with a threaded closure stud 30. After the bell 11 has been placed in position upon the base 10 and the water 29 has been let into the trough 14 until a continuous overflow condition over the weir 17 is established, the closure stud 30 is removed from the annular wall 21 and a quantity of low volatility oil is poured through the stud hold onto the surface of the water 29 which lies between the trough wall 15 and cylindrical skirt 22, the oil spreading out in a film 31 to completely cover the surface of the water within the skirt 22. Since the oil is of lower density than the water 29, the film 31 remains at the water surface and cannot be washed away by the flowing water through the trough 14 because of its entrapped position within the confines of the cylindrical skirt 22. The stud 30 is of course replaced in the annular wall 21 to prevent air entry, and the oil temperature is maintained below the oil vaporization range by the cooling effect of the water 29 constantly flowing through the trough 14 and out through the drain line 19. From the foregoing it will be appreciated that the oil film 31 produces the same effect as though the entire trough 14 were filled with oil and maintained in a constantly cooled state, without of course entailing the expense attendant to the provision of the oil cooling system.

It will of course be appreciated that while the invention has been illustrated and described in conjunction with a bell type annealing furnace employing electrical heating coils, the invention is just as readily usable with other types of furnaces and with furnaces heated by other means, as for example a gas heated furnace. Moreover, while oil has been specifically designated as the agent for effecting the surface film seal it will be understood that other substances of specific gravity less than unity and of very low volatility in the encountered temperature ranges could also be employed.

Having now described my invention in connection with a particularly illustrated embodiment thereof, it will be appreciated that modifications and variations of the same may now occur from time to time to those persons normally skilled in the art without departing from the essential spirit or scope of the invention, and accordingly it is intended to claim the same broadly as well as specifically as indicated by the appended claims.

What is claimed as new and useful is:

1. A bell type furnace, comprising in combination, a furnace base provided with an open-topped annular trough extending completely peripherally thereabout, said trough having an inner wall secured to said base and an outer wall positioned radially outward therefrom, means for establishing a continuous flow of water through said trough at a predetermined desired level, a furnace bell including a hood adapted for seating dispostion on the base and having formed at the lower end thereof a depending skirt extending completely thereabout, said skirt being disposable within said trough in radially outwardly spaced relation to the trough inner wall and with the lower edge of the skirt extending downward below the aforesaid predetermined desired trough water level to thereby seal the hood interior from the external atmosphere, and means associated with said bell for injecting a sufficient quantity of a low volatility substance of specific gravity less than unity into the region between said trough inner wall and said bell skirt to form an unbroken film of said substance over the complete surface of the water in said region, said means for establishing a continuous flow of water through said trough at a predetermined desired level including means for continuously injecting water into said trough and means for continuously withdrawing water from the trough surface between the depending bell skirt and the trough wall more remote from the furnace base.

2. A bell type furnace, comprising in combination, a furnace base provided with an open-topped annular trough extending completely peripherally thereabout, said trough having an inner wall secured to said base and an outer wall positioned radially outward therefrom, means for establishing a continuous flow of water through said trough at a predetermined desired level, a furnace bell including a hood adapted for seating disposition on the base and having formed at the lower end thereof a depending skirt extending completely thereabout, said skirt being disposable within said trough in radially outwardly spaced relation to the trough inner wall and with the lower elge of the skirt extending downward below the aforesaid predetermined desired trough water level to thereby seal the hood interior from the external atmosphere, and means for injecting a sufficient quantity of a low volatility substance of specific gravity less than unity into the region between said trough inner wall and said bell skirt to form an unbroken film of said substance over the complete surface of the water in said region, said means for establishing a continuous flow of water through said trough at a predetermined desired level including means for continuously injecting water into said trough and means for continuously withdrawing water from the trough surface between the depending bell skirt and the trough wall more remote from the furnance base.

3. A bell type furnace, comprising in combination, a furnace base provided with an open-topped annular trough extending completely peripherally thereabout, said trough having an inner wall secured to said base and an outer wall positioned radially outward therefrom, means for establishing a continuous flow of water through said trough at a predetermined desired level, a furnace bell including a hood adapted for seating disposition on the base and having formed at the lower end thereof a depending skirt extending completely thereabout, said skirt being disposable within said trough in radially outwardly spaced relation to the trough inner wall and with the lower edge of the skirt extending downward below the aforesaid predetermined desired trough water level to thereby seal the hood interior from the external atmosphere, the wall of said furnace bell being apertured in the region thereof above said skirt to provide an opening from the outside of said bell into the space between said bell skirt and said trough inner wall above the predetermined desired level of water in said trough for injecting into said space a sufficient quantity of a low volatility substance of specific gravity less than unity to form an unbroken film of said substance over the complete surface of the water in said space, and removable and replaceable closure means for the aperture in said furnace bell wall, said means for establishing a continuous flow of water through said trough at a predetermined desired level including means for continuously injecting water into said trough and means for continuously withdrawing water from the trough surface between the depending bell skirt and the trough wall more remote from the furnace base.

4. The method of sealing the furnace chamber of a bell type furnace from the external atmosphere, in which the furnace is of the type including a base having an open-topped water trough disposed peripherally thereabout and secured thereto, a bell adapted for seating disposition on the base and having formed at the lower end thereof a depending skirt extending completely thereabout with the lower edge of the skirt being disposable within the water trough below the top of and in radially outwardly spaced relation to the trough wall closest to the furnace base, comprising the steps of, filling the trough with water to a predetermined desired level above the lower edge of the bell skirt to effect a water seal for the furnace chamber, injecting a low volatility substance of specific gravity less than unity into the region between the bell skirt and the trough wall closest to the furnace base in sufficient quantity to form an unbroken film of said substance over the complete surface of the water between said bell skirt and trough wall closest to the furnace base, and simultaneously adding cool water to and withdrawing relatively warmer water from said trough in equal amounts to thereby maintain the predetermined desired water level and hold the temperature of the low volatility substance below the vaporization point, the added cool water being injected into the trough in such manner as to avoid disruption of the unbroken film of low volatility substance and the withdrawn warmer water being taken from the water surface between the depending bell skirt and the trough wall more remote from the furnace base.

5. The method of sealing the furnace chamber of a bell type furnace from the external atmosphere, in which the furnace is of the type including a base having an open-topped water trough disposed peripherally thereabout and secured thereto, a bell adapted for seating disposition on the base and having formed at the lower end thereof a depending skirt extending completely thereabout with the lower edge of the skirt being disposable within the water trough below the top of and in radially outwardly spaced relation to the trough wall closest to the furnace base, comprising the steps of, filling the trough with water to a predetermined desired level above the lower edge of the bell skirt to effect a water seal for the furnace chamber, injecting a low volatility liquid of specific gravity less than unity into the region between the bell skirt and the trough wall closest to the furnace base in sufficient quantity to permit the formation of an unbroken film of said liquid over the complete surface of the water between said bell skirt and trough wall closest to the furnace base and simultaneously adding cool water to and withdrawing relatively warmer water from said trough in equal amounts to thereby maintain the predetermined desired water level and hold the temperature of the low volatility liquid below the vaporization point, the added cool water being injected into the trough in such manner as to avoid disruption of the unbroken film of low volatility liquid and the withdrawn warmer water being taken from the water surface between the depending bell skirt and the trough wall more remote from the furnace base.

6. The method of sealing the furnace chamber of a bell type furnace from the external atmosphere, in which the furnace is of the type including a base having an open-topped water trough disposed peripherally thereabout and secured thereto, a bell adapted for seating disposition on the base and having formed at the lower end thereof a depending skirt extending completely thereabout with the lower edge of the skirt being disposable within the water trough below the top of and in radially outwardly spaced relation to the trough wall closest to the furnace base, comprising the steps of, filling the trough with water to a predetermined desired level above the lower edge of the bell skirt to effect a water seal for the furnace chamber, injecting a low volatility substance of specific gravity less than unity into the region between the bell skirt and the trough wall closest to the furnace base from a point above the water level in sufficient quantity to form an unbroken film of said substance over the complete surface of the water between said bell skirt and trough wall closest to the furnace base, and simultaneously adding cool water to and withdrawing relatively warmer water from said trough in equal amounts to thereby maintain the predetermined desired water level and hold the temperature of the low volatility substance below the vaporization point, the added cool water being injected into the trough in such manner as to avoid disruption of the unbroken film of low volatility substance and the withdrawn warmer water being taken from the water surface between the depending bell skirt and the trough wall more remote from the furnace base.

7. The method of sealing the furnace chamber of a bell type furnace from the external atmosphere, in which the furnace is of the type including a base having an open-topped water trough disposed peripherally thereabout and secured thereto, a bell adapted for seating disposition on the base and having formed at the lower end thereof a depending skirt extending completely thereabout with the lower edge of the skirt being disposable within the water trough below the top of and in radially outwardly spaced relation to the trough wall closest to the furnace base, comprising the steps of, filling the trough with water to a predetermined desired level above the lower edge of the bell skirt to effect a water seal for the furnace chamber, injecting a low volatility liquid of specific gravity less than unity into the region between the bell skirt and the trough wall closest to the furnace base from a point above the water level in sufficient quantity to permit the formation of an unbroken film of said liquid over the complete surface of the water between said bell skirt and trough wall closest to the furnace base and simultaneously adding cool water to and withdrawing relatively warmer water from said trough in equal amounts to thereby maintain the predetermined desired water level and hold the temperature of the low volatility liquid below the vaporization point, the added cool water being injected into the trough in such manner as to avoid disruption of the unbroken film of low volatility liquid and the withdrawn warmer water being taken from the water surface between the depending bell skirt and the trough wall more remote from the furnace base.

References Cited by the Examiner

UNITED STATES PATENTS

| | | | |
|---|---|---|---|
| 1,697,144 | 1/29 | Schonbrunn et al. | 266—5 |
| 2,546,572 | 3/51 | Wiggins | 220—45 X |
| 2,798,716 | 7/57 | Pugh | 263—49 |
| 2,843,514 | 7/58 | Kunz. | |
| 2,946,476 | 7/60 | Ross | 220—45 |
| 2,971,871 | 2/61 | Beggs | 266—5 X |

FOREIGN PATENTS

| | | |
|---|---|---|
| 555,258 | 8/43 | Great Britain. |

JOHN F. CAMPBELL, *Primary Examiner.*

MARCUS U. LYONS, MORRIS WOLK, *Examiners.*